United States Patent
Styer

(10) Patent No.: US 11,597,820 B2
(45) Date of Patent: Mar. 7, 2023

(54) RUBBER COMPOSITION AND TIRE COMPRISING SUSTAINABLE RESOURCES AND RELATED METHODS

(71) Applicant: Bridgestone Americas Tire Operations, LLC, Nashville, TN (US)

(72) Inventor: Justin J. Styer, Cortland, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 229 days.

(21) Appl. No.: 17/157,485

(22) Filed: Jan. 25, 2021

(65) Prior Publication Data

US 2021/0139676 A1    May 13, 2021

Related U.S. Application Data

(63) Continuation of application No. 16/298,516, filed on Mar. 11, 2019, now Pat. No. 10,899,914, which is a continuation of application No. 15/538,908, filed as application No. PCT/US2015/064504 on Dec. 8, 2015, now Pat. No. 10,227,479.

(60) Provisional application No. 62/095,934, filed on Dec. 23, 2014.

(51) Int. Cl.
| | |
|---|---|
| B60C 1/00 | (2006.01) |
| C08L 7/00 | (2006.01) |
| C08L 9/00 | (2006.01) |
| C08L 9/06 | (2006.01) |
| C08L 19/00 | (2006.01) |
| C08L 91/00 | (2006.01) |
| C08K 3/04 | (2006.01) |
| C08K 3/36 | (2006.01) |
| C08K 5/103 | (2006.01) |
| C08K 3/06 | (2006.01) |
| C08K 3/22 | (2006.01) |
| C08K 5/09 | (2006.01) |
| C08K 5/47 | (2006.01) |
| C08L 91/06 | (2006.01) |
| B60C 11/00 | (2006.01) |
| C08L 23/02 | (2006.01) |

(52) U.S. Cl.
CPC .............. *C08L 7/00* (2013.01); *B60C 1/0016* (2013.01); *B60C 11/005* (2013.01); *C08K 3/04* (2013.01); *C08K 3/06* (2013.01); *C08K 3/22* (2013.01); *C08K 5/09* (2013.01); *C08K 5/103* (2013.01); *C08K 5/47* (2013.01); *C08L 9/00* (2013.01); *C08L 9/06* (2013.01); *C08L 19/003* (2013.01); *C08L 23/02* (2013.01); *C08L 91/00* (2013.01); *C08L 91/06* (2013.01); *C08K 2201/019* (2013.01); *C08L 2205/03* (2013.01); *C08L 2205/06* (2013.01); *C08L 2207/322* (2013.01)

(58) Field of Classification Search
None
See application file for complete search history.

(56) References Cited

U.S. PATENT DOCUMENTS

| | | | |
|---|---|---|---|
| 4,764,547 A | 8/1988 | Hatanaka et al. | |
| 5,883,179 A | 3/1999 | Kawazoe et al. | |
| 6,407,180 B1 | 6/2002 | Wideman et al. | |
| 7,045,578 B2 | 5/2006 | Karato et al. | |
| 2002/0020479 A1 | 2/2002 | Shaffer | |
| 2003/0092783 A1 | 5/2003 | Udagawa et al. | |
| 2003/0092801 A1 | 5/2003 | Agostini et al. | |
| 2007/0161733 A1 | 7/2007 | Hogan et al. | |
| 2011/0095106 A1 | 4/2011 | James | |
| 2011/0166263 A1 | 7/2011 | Rikhoff et al. | |
| 2011/0172365 A1 | 7/2011 | Meredith et al. | |
| 2011/0265923 A1 | 11/2011 | Arnold et al. | |
| 2013/0023623 A1 | 1/2013 | Nakamura et al. | |
| 2013/0289183 A1 | 10/2013 | Kerns et al. | |
| 2014/0135437 A1 | 5/2014 | Sandstrom et al. | |

FOREIGN PATENT DOCUMENTS

| | | |
|---|---|---|
| CN | 101792546 A | 8/2010 |
| EP | 1031440 A2 | 7/2000 |
| EP | 2733170 A1 | 5/2014 |
| WO | 2011038578 A1 | 4/2011 |

OTHER PUBLICATIONS

PCT Written Opinion from PCT application No. PCT/US2015/064504, dated Mar. 2016 (7 pages).
PCT search report from PCT application No. PCT/US2015/064504, dated Mar. 2016 (4 pages).
Debapriya, et al., "Processing and Material Characteristics of a Reclaimed Ground Rubber Tire Reinforced Styrene Butadiene Rubber," Materials Sciences and Applications, vol. 2, 2011, pp. 486-496.
Supplementary European Search Report from EP application No. 15874099 dated Jul. 13, 2018 (4 pages).
European Search Opinion from EP application No. 15874099 dated Aug. 2018 (3 pages).

*Primary Examiner* — Vu A Nguyen
(74) *Attorney, Agent, or Firm* — Meredith E. Hooker; Jenny L. Sheaffer

(57) ABSTRACT

Recycled elements and/or renewable resources, such as recycled carbon black or recycled carbon black and recycled particulate rubber, are incorporated into a rubber composition. The rubber composition can be used to manufacture tires or various tire components including tire subtreads.

20 Claims, No Drawings

RUBBER COMPOSITION AND TIRE COMPRISING SUSTAINABLE RESOURCES AND RELATED METHODS

CROSS-REFERENCE TO RELATED APPLICATIONS

This application is a continuation of U.S. application Ser. No. 16/298,516, filed Mar. 11, 2019 and assigned U.S. Pat. No. 10,899,914, which is a continuation of U.S. application Ser. No. 15/538,908, filed on Jun. 22, 2017, which issued on Mar. 12, 2019, under U.S. Pat. No. 10,227,479, which is a U.S. national stage of International Application No. PCT/US2015/064504 filed Dec. 8, 2015, which claims priority to U.S. Provisional Application Ser. No. 62/095,934 filed Dec. 23, 2014, all of which are hereby incorporated by reference in their entirety.

TECHNICAL FIELD

This disclosure relates to rubber compositions and pneumatic tires using the same, and more particularly to various compositions for subtread material, wherein the various compositions include one or more renewable material resources.

BACKGROUND

Various compounds and/or additives are utilized in the preparation of reinforced rubber compositions for tire applications.

SUMMARY

The following is a brief summary of subject matter that is described in greater detail herein. This summary is not intended to be limiting as to the scope of the claims.

In an embodiment, a rubber composition includes a rubber elastomer, a plant oil, and a recycled carbon black.

In an embodiment, a method for preparing a tire composition includes mixing a rubber elastomer, a plant oil, and a recycled carbon black.

In an embodiment, a tire subtread composition includes a rubber elastomer, a plant oil, and a recycled carbon black.

The above summary presents a simplified summary in order to provide a basic understanding of some aspects of the compositions, items of manufacture, and/or methods discussed herein. This summary is not an extensive overview of the subject matter discussed herein. Its sole purpose is to present some concepts in a simplified form as a prelude to the more detailed description that is presented later.

DETAILED DESCRIPTION

The various, exemplary, non-limiting embodiments presented herein relate to utilizing renewable material resources in tire rubber compositions. In an aspect, while a subtread component may not be utilized in every tire, a subtread can be a lower hysteresis rubber composition, which can rebound and release energy quickly after undergoing deformation. The composition, size, and/or placement of a subtread component in a tire build can be adjusted to facilitate control of such tire characteristics as handling, road noise, ride quality, crack propagation, etc. Various embodiments are disclosed herein to facilitate incorporation of recyclable materials into subtread components which are cost favorable and also have no, or minimal, degradation in material properties compared with components formed from non-renewable resources.

In preparing the rubber compositions herein, any of the recycled materials described herein may be used. Rubbers, such as vulcanizable rubbers, may be used in producing the rubber compositions of the present disclosure. Suitable rubbers (or elastomers) include, but are not limited to, natural rubbers, synthetic rubbers and mixtures thereof. The synthetic elastomers typically derive from the polymerization of conjugated diene monomers, where the conjugated diene monomers may be copolymerized with other monomers such as vinyl aromatic monomers. Other rubbery elastomers may derive from the polymerization of ethylene together with one or more alpha-olefins and optionally one or more diene monomers.

The term "vulcanizable" as used herein means capable of undergoing a reaction with a vulcanizing agent, for example, a vulcanizing agent that forms a sulfidic bridge as part of a crosslink between two polymer chains. The sulfidic bridge may include 2 to 8 sulfur atoms, such as 2 to 4, or an average of about 2.5 to about 4.5.

As used herein, the term "natural rubber" or "NR" means naturally occurring rubber such as can be harvested from sources such as *Hevea* rubber trees, and non-*Hevea* source (e.g., guayule shrubs, and dandelions (e.g., TKS)). In other words, the term "natural rubber" should not be construed as including polyisoprene.

As used herein, the term "polyisoprene" means synthetic polyisoprene and natural polyisoprene. In other words, the term is used to indicate a polymer that is manufactured from isoprene monomers, and should not be construed as including naturally occurring natural rubber (e.g., *Hevea* natural rubber, guayule-sourced natural rubber or dandelion-sourced natural rubber). The term polyisoprene is also used interchangeably with the phrase "polyisoprene rubber" and the abbreviation "IR." A sub-set of polyisoprene is natural polyisoprene which comprises a polymer manufactured from a natural source of isoprene monomer.

As used herein, the term "phr" means parts per one hundred parts rubber.

For the purpose of this disclosure, any reference to a percent amount of a component in the rubber composition means a percent by weight, unless otherwise specified. Similarly, any reference to ratios of component amounts in the rubber composition means the ratios by weight, unless otherwise specified.

Useful elastomers having rubber properties (i.e., rubber elastomers) include natural rubber (e.g., *Hevea* rubber, guayule rubber), polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene (e.g., EPDM)), polysulfide rubber, acrylic rubber, urethane rubber, silicone rubber, epichlorohydrin rubber, crosslinked polyethylene, butyl rubber, halobutyl rubber, nitrile rubber, chlorinated polyethylene rubber, thermoplastic rubber, and mixtures thereof, as such terms are employed in The Vanderbilt Rubber Handbook, Thirteenth Edition, (1990). Any of the aforementioned rubber elastomers can have a myriad of macromolecular structures including linear, branched and star shaped. In one embodiment, the rubber composition comprises at least one rubber elastomer as follows: include natural rubber, isoprene, styrene-butadiene copolymers, and polybutadiene rubber. An rubber elastomer can be selected individually as well as in combination with at least one other rubber elastomer based at least in part on the desired final viscoelastic properties of a rubber compound formed from the elastomer(s).

The elastomers used herein may be prepared in by, for example, emulsion, solution, or bulk polymerization according to known suitable methods. The rubber compositions may be compounded or blended using mixing equipment and procedures conventionally employed in the art, such as kneaders, roll mills, and extruders.

In certain embodiments a blend of more than one rubber elastomer is utilized in the rubber compositions, the ratios (expressed in terms parts per hundred rubber (phr)) of such rubber elastomer blends can be adjusted according to the desired final viscoelastic properties desired for the rubber composition. For example, in certain embodiments natural rubber or polyisoprene may comprise about 5 phr to about 100 phr, such as about 25 phr to about 90 phr, or 50 phr to about 85 phr. In certain embodiments, natural rubber comprises about 5 phr to about 100 phr, including 5 to 100 phr, about 50 to about 100 phr, 50 to 100 phr, about 70 phr to about 100 phr, 70 to 100 phr, about 75 phr to about 100 phr, or 75 to 100 phr; with one or more synthetic rubbers comprising the remaining phr. In certain embodiments, natural rubber or natural polyisoprene comprises about 5 phr to about 100 phr, including 5 to 100 phr, about 50 to about 100 phr, 50 to 100 phr, about 70 phr to about 100 phr, 70 to 100 phr, about 75 phr to about 100 phr, or 75 to 100 phr; with one or more synthetic rubbers and the rubber from the recycled particulate rubber comprising the remaining, if any, phr. In certain embodiments, polybutadiene rubber or poly (styrene-butadiene) rubber may comprise about 95 phr to about 5 phr, such as about 75 phr to about 10 phr, or about 50 phr to about 15 phr. In certain embodiments, one of the naturally sourced and renewable rubbers above, such as natural rubber, including *Hevea* and/or guayule rubber, or natural polyisoprene is selected and comprises the entire rubber component.

In certain embodiments the rubber elastomer, has a number average molecular weight (Mn) of about 100,000 to about 1,000,000, such as about 150,000 to about 600,000, or about 250,000 to about 500,000. In certain embodiments, the polydispersity of the rubber elastomer (Mw/Mn) ranges from about 1.5 to about 6, including 1.5 to 6, about 2 to about 5, 2 to 5, about 3 to about 4, and 3 to 4.

In certain embodiments, a reinforcing filler can be incorporated into the rubber composition, where the reinforcing filler may be selected from the group consisting of carbon black, silica, and mixtures thereof. In an aspect, carbon blacks traditionally are formed from incomplete combustion of hydrocarbon feedstock. These reaction products may be considered virgin carbon black. As an alternative or additional filler, as presented herein, carbon black can be sourced from a recycled material. Such recycled material can include reclaimed or recycled vulcanized rubber, whereby the vulcanized rubber is typically reclaimed from manufactured articles such as a pneumatic tire, an industrial conveyor belt, a power transmission belt, and a rubber hose. The recycled carbon black may be obtained by a pyrolysis process or other methods known for obtaining recycled carbon black. In an aspect, a recycled carbon black can be formed from incomplete combustion of recycled rubber feedstock or rubber articles. The carbon blacks utilized in the preparation of the vulcanizable elastomeric compositions can be in pelletized form or an unpelletized flocculent mass.

One or more of a plurality of virgin carbon blacks may also be incorporated into a rubber composition, where such carbon blacks can be, for example, furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. Exemplary carbon blacks include, but are not limited to: N-110, N-220, N-339, N-330, N-352, N-550, and N-660, as designated by ASTM D-1765-82a.

As discussed above, recycled carbon black is utilized in the rubber compositions in an amount of about 1 to about 80 phr. One or more than one recycled carbon black may be utilized to comprise the about 1 to about 80 phr. In certain embodiments, carbon black (recycled, or recycled+virgin) can be present in amounts ranging from about 1 to about 80 phr, including 1 to 80 phr, about 1 to about 45 phr, 1 to 45 phr, about 5 to about 60 phr, 5 to 60 phr, about 35 to about 45 phr, or 35 to 45 phr. Further, a combination of conventional carbon black and recycled carbon black can be present in amounts ranging from about 1 to about 45 phr recycled carbon black and about 1 to about 30 phr conventional carbon black, 1 to 45 phr recycled carbon black and 1 to 30 phr conventional carbon black, from about 20 to about 45 phr recycled carbon black and about 10 to about 30 phr conventional carbon black, from 20 to 45 phr recycled carbon black and 10 to 30 phr conventional carbon black, from about 35 to about 42 phr recycled carbon black and about 1 to about 10 phr conventional carbon black, or from 35 to 42 phr recycled carbon black and 1 to 10 phr conventional carbon black.

In certain embodiments, the recycled carbon black is the entire carbon black component of the compound, or the majority of the carbon black component of the compound, or at least about 75% of the carbon black component of the compound. In certain embodiments, the recycled carbon black is the entire filler component of the compound, or the majority of the filler component of the compound, or at least about 75% of the filler component of the compound. In certain embodiments, the rubber composition is essentially free of any carbon black other than the recycled carbon black. In certain embodiments, the rubber composition is essentially free of any carbon black other than the recycled carbon black and any carbon black provided by the recycled particulate rubber. As used herein, the phrase "essentially free of any carbon black other than . . . " means no more than 5 phr of other carbon black, preferably no more than 1 phr of other carbon black, including 0 phr of other carbon black.

Either of the conventional carbon black and the recycled carbon black may have a surface area of at least about 20 $m^2/g$, including at least about 35 $m^2/g$, at least 35 $m^2/g$, up to about 300 $m^2/g$, up to 300 $m^2/g$, about 50 $m^2/g$ to about 200 $m^2/g$, and 50 $m^2/g$ to 200 $m^2/g$, as determined by ASTM D-1765 using the cetyltrimethyl-ammonium bromide (CTAB) technique. The conventional carbon black and the recycled carbon black may also have a surface area of at least about 20 $m^2/g$, including at least about 35 $m^2/g$, at least 35 $m^2/g$, up to about 300 $m^2/g$, up to 300 $m^2/g$, about 50 $m^2/g$ to about 200 $m^2/g$, and 50 $m^2/g$ to 200 $m^2/g$, as determined by $N_2SA$. Average particle diameter may range from 15 to 100 nm, such as 20 to 70 nm, or 30 to 60 nm.

Examples of reinforcing silica fillers which can be used include wet silica (hydrated silicic acid), dry silica (anhydrous silicic acid), and calcium silicate. Among these, precipitated amorphous wet-process, hydrated silicas are preferred. Silica can be employed in an amount of about 1 to about 100 phr (including 1 to 100 phr), or in an amount of about 5 to about 80 phr (including 5 to 80 phr), or in an amount of about 30 to about 70 phr (including 30 to 70 phr). The useful upper range is limited by the high viscosity imparted by fillers of this type. Some of the commercially available silicas that can be used include, but are not limited to, HiSil® 190, HiSil® 210, HiSil® 215, HiSil® 233, and HiSil® 243, produced by PPG Industries (Pittsburgh, Pa.). A number of useful commercial grades of different silicas are also available from DeGussa Corporation (e.g., VN2, VN3), Rhone Poulenc (e.g., Zeosil® 1165MP0), and J. M. Huber Corporation.

The surface area of the silicas may, for example, be about 32 $m^2/g$ to about 400 $m^2/g$, including 32 $m^2/g$ to about 400 $m^2/g$, 100 $m^2/g$ to about 250 $m^2/g$, 100 $m^2/g$ to 250 $m^2/g$, about 150 $m^2/g$ to about 220 $m^2/g$, 150 $m^2/g$ to 220 $m^2/g$, about 150 $m^2/g$ to about 300 $m^2/g$, or 150 $m^2/g$ to 300 $m^2/g$. The pH of the silica filler is generally about 5.5 to about 7 or about 6 to about 7.2, or about 5.5 to about 6.8.

If silica is used as a filler, it may be desirable to use a coupling agent to couple the silica to any of the rubbers or elastomers utilized. Numerous coupling agents are known, including but not limited to organosulfide polysulfides. Any organosilane polysulfide may be used. Suitable organosilane polysulfides include, but are not limited to, 3,3'-bis(trimethoxysilylpropyl)disulfide, 3,3'-bis(triethoxysilylpropyl)disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxydiethoxysilylethyl)tetrasulfide, 2,2'-bis(tripropoxysilylethyl)pentasulfide, 3,3'-bis(tricycloneoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxyethoxypropoxysilyl 3'-diethoxybutoxy-silylpropyl tetrasulfide, 2,2'-bis(dimethylmethoxysilylethyl)disulfide, 2,2'-bis(dimethylsecbutoxysilylethyl) trisulfide, 3,3'-bis(methylbutylethoxysilylpropyl)tetrasulfide, 3,3'-bis(di t-butylmethoxysilylpropyl) tetrasulfide, 2,2'-bis(phenylmethylmethoxysilylethyl)trisulfide, 3,3'-bis(diphenyl isopropoxysilylpropyl)tetrasulfide, 3,3'-bis(diphenylcyclohexoxysilylpropyl)disulfide, 3,3'-bis(dimethylethylmercaptosilylpropyl)tetrasulfide, 2,2'-bis(methyldimethoxysilylethyl)trisulfide, 2,2'-bis(methylethoxypropoxysilylethyl)tetrasulfide, 3,3'-bis(diethylmethoxysilylpropyl)tetrasulfide, 3,3'-bis(ethyldi-secbutoxysilylpropyl)disulfide, 3,3'-bis(propyldiethoxysilylpropyl)disulfide, 3,3'-bis(butyldimethoxysilylpropyl)trisulfide, 3,3'-bis(phenyldimethoxysilylpropyl)tetrasulfide, 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,18'-bis(trimethoxysilyloctadecyl)tetrasulfide, 18,18'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide, and 3-octanoylthio-1-propyltriethoxysilane (NXT). Mixtures of various organosilane polysulfide compounds can be used.

The amount of coupling agent in the composition is based on the weight of the silica in the composition. The amount of coupling agent present in the composition may be from about 0.1% to about 20% by weight of silica, or from about 1% to about 15% by weight of silica, or from about 2% to about 10% by weight of silica. For example, typical amounts of coupling agents include about 4, 6, 8, and 10 phr; or in ranges from about 0 to about 30 phr, and in another embodiment, from about 5 to about 15 phr.

When both carbon black and silica are employed in combination as the reinforcing filler, they may be used in a carbon black-silica ratio of about 10:1 to about 1:4, including 10:1 to 1:4, about 5:1 to about 1:3, 5:1 to 1:3, about 2:1 to about 1:2, and 2:1 to 1:2. In certain embodiments, recycled carbon black may be used in the same ratios with silica.

In certain embodiments, the rubber composition further comprises (includes) a recycled particulate rubber. Recycled particulate rubber is typically broken down and reclaimed (or recycled) by any of a plurality of processes, which can include physical breakdown, grinding, chemical breakdown, devulcanization, cryogenic grinding, a combination thereof, etc. The term recycled particulate rubber can relate to both vulcanized and devulcanized rubber, where devulcanized recycle or recycled rubber (reclaim rubber) relates to rubber which has been vulcanized, ground into particulates and may have further undergone substantial or partial devulcanization. In certain embodiments, the recycled particulate rubber used in the composition is essentially free of devulcanization. In a situation where the vulcanized rubber contains wire or textile fiber reinforcement, such wire or reinforcement can be removed by any suitable process such as magnetic separation, air aspiration and/or air flotation step. In certain embodiments, the "recycled particulate rubber" comprises cured, i.e., vulcanized (cross-linked) rubber that has been ground or pulverized into particulate matter having a mean average particle size as discussed below.

The resulting recycled particulate rubber is a polymeric material that may have differences in structure and different properties compared with virgin rubber. The recycled particulate rubber may be comprised of a mixture or variety of polymeric units, where such polymeric units can be comprised of units of unvulcanized rubber or vulcanized rubber. Further, the recycled particulate rubber can also be a complex mixture of largely unknown polymer(s), of compounding ingredients, and bits of textile fiber, while a conventional unvulcanized rubber will have a much greater level of purity. In some instances, the addition of sulfur and accelerator to recycled particulate rubber, and subsequent revulcanization, can lead to physical properties (e.g., tensile strength, elongation, etc.) which are typically lower than the corresponding physical properties of the original vulcanized rubber from which the recycled particulate rubber was derived. Further, recycled particulate rubber may exhibit oxidation degradation owing to a deficiency of antidegradants which would normally have been adequately present in unvulcanized, compounded rubber. Antidegradants are conventionally mixed with the rubber utilized in tire manufacture to counteract operational effects. Operational effects can include 'aging' which can result from weathering due to atmospheric conditions, fatigue cracking due to continual flexing of the tire under operating conditions, and abrasion of the rubber due to scuffing. Weathering can be due to exposure to ultraviolet light, ozone, high humidity, etc. Fatigue cracking can result from a formation, and propagation of a crack through a rubber component (e.g., a tire sidewall) over time as a function of the continual flexing of the tire during operational loading/unloading.

In certain embodiments, the recycled particulate rubber has a mean average particle size of about 35 to about 600 microns, including 35 to 600 microns, about 100 to about 350 microns, 100 to 350 microns, about 150 to about 250 microns, and 150 to 250 mmicrons. The average particle size may be measured by any conventional means known in the art including the methods according to ASTM D5644. In certain embodiments, the recycled particulate rubber may correlate to a U.S. mesh size of about 400 to about 25, including 400 to 25, about 300 to about 100, 300 to 100, about 250 to about 150, and 250 to 150.

As discussed above, in certain embodiments, recycled particulate rubber may be incorporated into a subtread compound. Generally, in such embodiments and in the other embodiments disclosed herein, the recycled particulate rubber can be utilized in conjunction with any of natural rubber, butadiene rubber, styrene-butadiene rubber, other previously mentioned rubbers or elastomer, or combinations thereof. Generally, when utilized, the recycled particulate rubber can be present, for example, in amounts ranging from about 1 to about 75 phr, including 1 to 75 phr, about 1 to about 45 phr, 1 to 45 phr, about 4 to about 15 phr, 4 to 15 phr, about 3 to about 45 phr, 3 to 45 phr, about 10 to about 25 phr, and 10 to 25 phr.

In a further exemplary composition, a blend of natural rubber, butadiene rubber and recycled particulate rubber can be processed. In further exemplary compositions, butadiene rubber and recycled carbon black can be combined with natural rubber in an amount ranging from about 1 to about 20 phr of butadiene rubber, about 98 to about 80 phr natural rubber, with an amount of from about 1 to about 20 phr of recycled particulate rubber.

In a conventional rubber composition, an aromatic oil or other oil, such as a naphthenic oil, can be incorporated, where such oils can be utilized to facilitate processing of the rubber as well as affecting the road performance of a tire. Oils or processing aids commonly include a broad category of substances that improve various aspects of the process of forming vulcanizable compositions and vulcanizates. For example, oils or processing aids may prevent filler agglomeration and reduce viscosity. However, petroleum-based oils are disfavored in some application and are non-renewable, and hence, substitution of an oil from a renewable source, such as plant oil, may be advantageous if performance characteristics can be maintained. Accordingly, a plant oil or plant fat may be incorporated into a subtread composition. In certain embodiments, such components include a plant-based triglyceride.

Various plant oils are suitable for use in the rubber compositions disclosed herein. One or more than one plant oil may be utilized. Suitable plant oils include, in a non-exhaustive list, palm oil, soybean oil (also referred to herein as soy oil), rapeseed oil, sunflower seed, peanut oil, cottonseed oil, oil produced from palm kernel, coconut oil, olive oil, corn oil, grape seed oil, hazelnut oil, oil produced from any nut (e.g., beech nuts, cashews, mongongo nuts, macadamia nuts, pine nuts, hazelnuts, chestnuts, acorns, almonds, pecans, pistachios, walnuts, or brazil nuts), hemp oil, linseed oil, rice oil, safflower oil, sesame oil, mustard oil, flax oil, and combinations thereof. The respective oil(s) can be produced by any suitable process such as mechanical extraction (e.g., using an oil mill), chemical extraction (e.g., using a solvent, such as hexane or carbon dioxide), pressure extraction, distillation, leaching, maceration, purification, refining, hydrogenation, sparging, etc.

In certain embodiments, the total processing oil (e.g., plant oil, or other compound) utilized in a rubber compound can be present in a range from about 1 to about 75 phr, in another embodiment, from about 5 to about 40, and in another embodiment from about 2 to 8 phr. In certain embodiments, the plant oil is the entire oil component of the compound, or the majority of the oil component of the compound, or at least about 75% of the oil component of the compound. In certain embodiments, the oil used has an aliphatic carbon chain of 4-24 carbon atoms, such as 12 to 22, or 16 to 18. In certain embodiments, the oil used has 0 to 3 points of unsaturation, such as 1 to 2 points of unsaturation. In certain embodiments, the composition is exclusive or substantially free of oils with an aliphatic carbon chain of greater than 24 carbon atoms. In certain embodiments, the rubber composition is essentially free of any processing oil other than the plant oil. In certain embodiments, the rubber composition is essentially free of any processing or extender oil other than that provided by the plant oil. As used herein, the phrase "essentially free of any oil other than . . . " means no more than 10 phr of other oil, preferably no more than 5 phr of other oil, including 0 phr of other oil. In certain embodiments, the other process oil, other extender oil or both refers to petroleum-based oils such as aromatic, naphthenic, paraffinic, MES, TDEA, and TRAE oils.

In certain embodiments, an oil component and/or processing aid component of the composition consists essentially of the plant oil and a carbon black component consists essentially of the recycled carbon black. The "oil component" and "processing aid component" mean the entire amount of oil or processing aids, respectively, present in the composition, and the carbon black component means the entire amount of carbon black present in the composition. "Consists essentially of" in this instance, means the specified materials and those that do not materially affect the basic and novel characteristics of the composition, for example, an unspecified material that does not materially affect the basic and novel characteristics of the composition, in an amount of less than about 5%, less than about 3%, or less than about 1% may be encompassed by this term. In certain embodiments, any oil component of the rubber composition consists essentially of the plant oil and any carbon black component consists essentially of the recycled carbon black.

The rubber compositions may comprise further ingredients that are known and conventional in the rubber compositions, including additive materials such as, but not limited to, curing agents (for a general disclosure of suitable vulcanizing agents one can refer to Kirk-Othmer, *Encyclopedia of Chemical Technology*, $3^{rd}$ ed., Wiley Interscience, N.Y. 1982, Vol. 20, pp. 365-468, particularly "*Vulcanization Agents and Auxiliary Materials*" pp. 390-402 and A. Y. Coran, Vulcanization in Encyclopedia of Polymer Science and Engineering ($2^{nd}$ Ed. 1989), which are incorporated herein by reference), activators, retarders and accelerators; processing additives, such as resins, including tackifying resins, reinforcing resins, plasticizers, pigments, fatty acids, waxes, antioxidants, antiozonants, peptizing agents, and scorch inhibiting agents. The additives mentioned above may be selected and commonly used in conventional amounts. Some of these additives are described in further detail below.

The amount of sulfur vulcanizing agent in a rubber composition may be, for example, from about 0 to about 10 phr (including 0 to 10 phr), in another embodiment, from about 0.1 to about 5 phr (including 0.1 to 5 phr); and in another embodiment, from about 0.3 to about 1.5 phr (including 0.3 to 1.5 phr).

During production of a rubber compound, activation of sulfur vulcanization can be facilitated by stearic acid in conjunction with a metallic oxide, such as zinc oxide (ZnO). In an aspect, a vulcanizing operation undertaken only with sulfur can be a slow process. However, the addition of stearic acid and/or ZnO can act to increase the efficiency of crosslinking occurring during the vulcanization process, with the ZnO operating as an activator for sulfur vulcanization. ZnO can be present in a rubber compound from about 0 to about 10 phr (including 0 to 10 phr), in another embodiment, from about 0.75 to about 5 phr (including 0.75 to 5 phr), and in another embodiment from about 2 to about 5 phr (including 2 to 5 phr). Stearic acid can be present in a rubber compound from about 0 to about 5 phr (including 0 to 5 phr), in another embodiment, from about 0 to about 3 phr (including 0 to 3 phr), and in another embodiment at about 2 phr (including 2 phr).

In certain embodiments, as previously mentioned, an antidegradant can be utilized to protect the rubber from the oxidation effects of atmospheric ozone. Many antidegradants are staining antidegradants, i.e., they cause a decrease in the visual appearance of a rubber composition. The amount of total antidegradant or staining antidegradant in a rubber composition may be, for example, from about 0.1 to about 15 phr, including from 0.1 to 15 phr, from about 0.3 to about 6 phr, from 0.3 to 6 phr, about 2 to about 7 phr, and 2 to 7 phr.

The antidegradant may be classified as an antiozonant or antioxidant, such as those selected from: N,N'disubstituted-p-phenylenediamines, such as N-1,3-dimethylbutyl-N' phenyl-p-phenylenediamine (6PPD), N,N'-Bis(1,4-dimethyl-pently)-p-phenylenediamine (77PD), N-phenyl-N-isopropyl-p-phenylenediamine (IPPD), and N-phenyl-N'-(1, 3-dimethylbutyl)-p-phenylenediamine (HPPD). Other examples of antidegradants include, Acetone diphenylamine condensation product, 2,4-Trimethyl-1,2-dihydroquinoline, Octylated Diphenylamine, and 2,6-di-t-butyl-4-methyl phenol. In certain embodiments, the composition may be free or essentially free of antioxidants or antiozonants.

Certain additional fillers may also be utilized, including mineral fillers, such as clay, talc, aluminum hydrate, aluminum silicate, hydrated aluminum silicate, magnesium silicate, aluminum hydroxide, magnesium hydroxide, starch and mica. The foregoing additional fillers are optional and can be utilized in the amount of about 0.5 phr to about 40 phr (including 0.5 to 40 phr). Further, one or more fillers can be present in volumes ranging from about 0 to about 150 phr (including 0 to 150 phr), and in another embodiment, from about 30 to about 80 phr (including 30 to 80 phr).

In certain embodiments, the composition comprises a surfactant. Examples of surfactants that may be added include, but are not limited to, polyoxyethylene sorbitan monostearate and ether thioether surfactants.

The amount of surfactant to be mixed into the vulcanizable rubber compound depends on the desired final appearance, as well as other environmental considerations such as expected ozone exposure. The amount of surfactant ranges, for example, from 0 to about 10 phr, such as about 0.5 to about 5 phr, or about 1 to about 3 phr.

Accelerators that may be used suitably include thiazoles, dithiocarbamates, dithiophosphates, guanidines, sulfenamides, sulfenimides, and thiurams. Specific examples include 2-mercaptobenzothiazole, dibenzothiazyl disulfide, N-cyclohexyl-2-benzothiazyl-sulfenamide (CBS), N-tert-butyl-2-benzothiazyl sulfenamide (TBBS), and 1,3-diphenylguanidine In summary, without limitation, a tire component compound typically contains elastomers, fillers, processing oils/aids, antidegradants, zinc oxide, stearic acid, sulfur, accelerators and coupling agents, where one or more components of a rubber compound includes a renewable and/or recyclable component.

In preparing the rubber compositions, in one embodiment, an initial masterbatch is prepared that includes the rubber component and the reinforcing fillers, as well as other optional non-curative additives, such as processing oil, and antioxidants. After the masterbatch is prepared, one or more optional remill stages can follow in which either no ingredients are added to the first mixture, or the remainder of the non-curing ingredients are added, in one embodiment, to reduce the compound viscosity and improve the dispersion of the reinforcing filler. The final step of the mixing process is the addition of vulcanizing agents to the mixture. In certain embodiments, the masterbatch process can have mixing conditions with a temperature of 320° F. utilizing a Banbury mixer at 65 RPM. These mixing conditions are maintained for the amount of time necessary to achieve good dispersion of the filler within the rubber.

In more detail concerning the masterbatch process, the vulcanizable rubber composition may be prepared by forming an initial masterbatch composition that includes elastomer and other ingredients. To prevent premature vulcanization, this initial composition generally excludes any vulcanizing agents.

Once the initial masterbatch composition is processed, the vulcanizing agents may be introduced and blended into the initial masterbatch to form a final mix. Additional ingredients, such as accelerators, may be added to the final mix during this stage. The final mix in one embodiment, is prepared at low temperatures that do not initiate the vulcanization process.

Optionally, additional mixing stages can be employed between the initial stage and the final mix stage. Additional mixing stages where no additional ingredients are added can be referred to as remill stages, while mixing stages where ingredients are added are called masterbatch stages, and can be further denoted by ordinal designations, such as second masterbatch and so on.

In between each mixing stage, the mixed composition may be cooled to a surface temperature below the intended temperature for the next mixing step. This may be accomplished by discharging the mixed composition, cooling, and recharging the same mixer apparatus or transferring the composition to another mixer. Alternatively, the mixed composition may be cooled within the mixer.

The final mixing stage, during which the cure agents and accelerators are added, is performed at a temperature below the vulcanization temperature. More specifically, the mixing conditions are, in one embodiment, controlled to achieve a surface temperature of the composition of about 210° F. utilizing a Banbury mixer at, for example, a speed of about 45 RPM. These conditions are maintained for the amount of time necessary to achieve good mixing.

mixing the respective rubber compositions from the first stage with sulfur, sulfur curative (stearic acid), and an accelerator (e.g., N-Cyclohexyl-2-Benzothiazolesulfenamide (CBS)), with a Banbury mixer operating to a maximum temperature of about 210° F., at about 40 RPM, for about 160 seconds. The final formulations of each example were removed from the mixer, at which time the temperature of the Final Formulation portion was about 210° F. Samples for each of the compounds were then vulcanized at a temperature of about 150° F. for about 40 minutes. The measured physical properties for the resulting vulcanized subtread rubber compositions are shown in Table 2.

TABLE 1

Table 1: Control Composition M and Example Compositions A-F, where SBR = styrene butadiene rubber (5% styrene, 26% vinyl, trans 38% (butadiene portion), 30.4% cis (butadiene portion) Tg −77° C.), BR = polybutadiene rubber (high cis (96%), Tg −109° C.), CB = carbon black, AO = antioxidant, CBS = N-cyclohexyl-2-benzothiazyl-sulfenamide.

| | | M | A | B | C | D | E | F |
|---|---|---|---|---|---|---|---|---|
| First (Non-Productive) Stage | Natural Rubber | 80 | 100 | 100 | 100 | 85 | 85 | 90 |
| | SBR | 20 | 0 | 0 | 0 | 0 | 0 | 0 |
| | BR | 0 | 0 | 0 | 0 | 15 | 15 | 10 |
| | Recycled CB | 0 | 42 | 42 | 35 | 35 | 35 | 42 |
| | N550 CB | 35 | 0 | 0 | 0 | 10 | 10 | 0 |
| | Zinc Oxide | 2 | 2 | 2 | 2 | 0.75 | 0.75 | 0.75 |
| | Naphthenic Oil | 5.5 | 0 | 0 | 0 | 0 | 0 | 0 |
| | Soy Oil | 0 | 8 | 8 | 6.5 | 5 | 5 | 5 |
| | AO/Wax | 7 | 0 | 0 | 0 | 0 | 0 | 0 |
| | Ground Rubber (200 Mesh) | 0 | 0 | 4.73 | 4.73 | 15.63 | 0 | 15 |
| | Total | 149.5 | 152 | 156.73 | 148.23 | 166.38 | 150.75 | 162.75 |
| Second (Final) Stage | Sulfur | 1.5 | 1.5 | 1.5 | 1.5 | 1.5 | 1.5 | 1.5 |
| | CBS | 2 | 2 | 2 | 3 | 2 | 2 | 2 |
| | Stearic Acid | 2 | 2 | 2 | 2 | 2 | 2 | 2 |
| | Total | 155 | 157.5 | 162.23 | 154.73 | 171.88 | 156.25 | 168.25 |

The following examples are given for the purpose of illustration only, and are not to be construed as limiting the scope of this invention in any way.

Viscosity may be obtained using ASTM D6204-12. Tensile may be determined by ASTM-D412(1998) Method B, at 25° C. Elongation may be determined by ASTM-D412 (1998) Method B, at 25° C. 50% to 300% Modulus may be determined by ASTM-D412(1998) Method B, at 25° C.

EXAMPLES

Table 1 presents control composition, M, for a subtread component, and six exemplary compositions A-F. All of the compositions, M and A-F were mixed in two stages.

For the first non-productive mix stage, the ingredients listed in Table 1 were mixed for approximately 240 seconds at a maximum temperature of about 320° F., utilizing a (6 lb) Banbury mixer operated at 65 RPM (revolutions per minute). The resultant product was transferred to a mill operating at a temperature of about 100° F., where the product was then sheeted and subsequently cooled to room temperature) The various formulations from each respective masterbatch operation were then finalized. Finalizing comprised As shown in Table 1, the various compositions A-F were formed with the following compound ranges: natural rubber=85 to 100 phr, BR=10 to 15 phr, recycled carbon black=35 to 42 phr, N550 carbon black=0 to 10 phr, ZnO=0.75 to 2 phr, soy oil=5 to 8.5 phr, ground rubber (200 mesh)=4.73 to 15.63 phr, sulfur 1.5 phr, CBS 2 phr, stearic acid 2 phr.

In comparison with control composition M, compositions A-F have respective volumes of recycled carbon black (e.g., from about 35 to about 42) utilized to offset all, or a portion of, the carbon black utilized in the base composition M. Further, soy oil has been incorporated into the compositions A-F (e.g., from about 5 to about 8) to act as a replacement of the naphthenic oil and/or the anti-oxidant/wax in the base composition. Furthermore, the example compositions B-F also include a volume of ground rubber (e.g., from about 4.73 to about 15.63). The various measured properties for the respective vulcanized final compositions A-F and the base composition M are shown in Table 2, below.

TABLE 2

TABLE 2: Physical Properties of control composition M, and example compositions A-F.

|  |  | M | A | B | C | D | E | F |
|---|---|---|---|---|---|---|---|---|
| S/S RT, Normal (MPa) | 50% | 1.0 | 0.7 | 0.8 | 0.8 | 0.7 | 0.7 | 0.7 |
|  | 100% | 1.8 | 1.2 | 1.2 | 1.3 | 1.2 | 1.1 | 1.0 |
|  | 200% | 4.7 | 2.6 | 2.7 | 2.9 | 2.6 | 2.5 | 2.1 |
|  | 300% | 9.1 | 4.8 | 5.3 | 5.4 | 5.1 | 4.7 | 3.9 |
|  | TB | 19.9 | 25.8 | 23.2 | 21.4 | 21.7 | 22.4 | 21.9 |
|  | % EB | 502 | 680 | 626 | 565 | 685 | 752 | 764 |
| S/S 100° C., Normal (MPa) | % EB | 397 | 814 | 741 | 503 | 735 | 823 | 803 |
|  | TB*EB | 3249 | 10836 | 8601 | 4196 | 8910 | 10430 | 9066 |
| S/S RT, Aged 2D/212F | 300% | 10.4 | 4.1 | 4.3 | 5.0 | 4.7 | 3.5 | 3.7 |
|  | TB | 17.6 | 16.9 | 14.3 | 17.3 | 13.5 | 11.1 | 12.7 |
|  | % EB | 440 | 702 | 628 | 597 | 576 | 604 | 619 |
| Spectro | E' @ 30° C. | 4.3 | 3.0 | 2.9 | 3.2 | 4.3 | 3.7 | 3.6 |
|  | Tan Δ @ 60° C. | 0.062 | 0.119 | 0.124 | 0.102 | 0.143 | 0.148 | 0.148 |
| RPA Rheometer 266° F. | Indexed RPA Viscosity | 1.00 | 1.00 | 1.08 | 1.03 | 0.74 | 0.86 | 0.77 |
|  | Scorch SP | 14.44 | 18.01 | 20.84 | 13.31 | 13.56 | 17.61 | 14.99 |

From the data reported in Tables 1 and 2, the following observations can be made. The observations are based on comparing example compositions A-F with control composition M. The comparison unexpectedly reveals that it is possible to form a rubber composition suitable for tire subtread components which include recycled, renewable, and/or environmentally friendly materials, whereby such subtread compounds have properties which are comparable to, or an improvement on, existing subtread compounds.

Reviewing the property data presented in Table 2, the following findings can be promulgated. Stress-strain data (e.g., as measured at room temperature) for the sustainable compounds (compounds A-F) is greater or equivalent to that measured for the control composition M. Further, also the stress-strain data, as measured at both 100° C. and as also obtained for the room temperature aged, is comparable or improved for the sustainable compounds A-F. Further, the sustainable compounds have at least equivalent properties for viscoelasticity, e.g., Tan Δ@60 and E'@30. Further the scorch time is improved for the compositions A-F in comparison with the control composition M.

The viscosities disclosed herein are real dynamic viscosities determined using an Alpha Technologies RPA (Rubber Process Analyzer) instrument which is rotorless. Measurements were made following the guidance of, but not strictly according to ASTM D 6204. In accordance with ASTM D 6204, a three point frequency sweep was conducted. The rubber compositions were pre-heated for 1 minute at 130° C. In accordance with the ASTM procedure, strain sweep was conducted at 130° C., strain at 100 percent, and 1 Hz were conducted. The viscosities are reported as indexed viscosities, calculated by dividing the control by the experimental value, which provides an indication of the decrease or increase in viscosity by adding the recycled carbon black or recycled carbon black and recycled particulate rubber.

It is expected that the rubber compositions as previously presented, which include a plant oil, and recycled carbon black, will be useful in preparing pneumatic tires, tire components such as treads, subtreads, sidewalls, body ply skims, bead filler, hoses, and belts.

The term "or" is intended to mean an inclusive "or" rather than an exclusive "or." That is, unless specified otherwise, or clear from the context. Further, as used herein, the term "exemplary" is intended to mean "serving as an illustration or example of something".

The articles "a", "an", and "the" should be interpreted to mean "one or more" unless the context clearly indicates the contrary.

All references, including but not limited to patents, patent applications, and non-patent literature are hereby incorporated by reference herein in their entirety.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A tire subtread comprising a rubber composition comprising
    a rubber elastomer comprising 25 to 90 phr of natural rubber or polyisoprene and 75 to 10 phr of polybutadiene or styrene-butadiene,
    a recycled particulate rubber in an amount of about 1 phr to about 45 phr,
    about 1 to about 40 phr of a plant oil, and
    reinforcing filler including about 1 to about 45 phr of a recycled carbon black, up to about 30 phr of a carbon black other than the recycled carbon black, and about 1 to about 30 phr of silica,
    wherein the composition contains no more than 10 phr of any oil other than the plant oil.

2. The tire subtread of claim 1, wherein the plant oil comprises at least one of soybean oil, palm oil, rapeseed oil, sunflower seed oil, peanut oil, cottonseed oil, oil produced from palm kernel, coconut oil, olive oil, corn oil, grape seed oil, hazelnut oil, a nut oil, hemp oil, linseed oil, rice oil, safflower oil, sesame oil, mustard oil, or flax oil.

3. The tire subtread of claim 2, comprising a total amount of about 2 to about 8 phr of the at least one plant oil.

4. The tire subtread of claim 1, wherein the plant oil comprises soybean oil.

5. The tire subtread of claim 1, wherein the plant oil comprises sunflower oil.

6. The tire subtread of claim 1, wherein the carbon black other than the recycled carbon black is present in an amount of about 5 to about 30 phr.

7. The tire subtread of claim 1, wherein the carbon black other than the recycled carbon black is present in an amount of no more than 10 phr.

8. The tire subtread of claim 1, having an overall ratio of carbon black to silica of 2/1 to 1/2.

9. The tire subtread of claim 1, wherein the rubber elastomer includes 50 to 75 phr of styrene-butadiene.

10. The tire subtread of claim 1, wherein the rubber elastomer includes 50 to 75 phr of polybutadiene.

11. A tire subtread comprising a rubber composition comprising a rubber elastomer comprising at least 50 phr of natural rubber or polyisoprene, a recycled particulate rubber in an amount of about 5 to about 45 phr, about 1 to about 40 phr of a plant oil, reinforcing filler including about 1 to about 45 phr of a recycled carbon black, up to about 30 phr of a carbon black other than the recycled carbon black, and about 1 to about 30 phr of silica, wherein the composition contains no more than 10 phr of any oil other than the plant oil.

12. The tire subtread of claim 11, wherein the plant oil comprises at least one of soybean oil, palm oil, rapeseed oil, sunflower seed oil, peanut oil, cottonseed oil, oil produced from palm kernel, coconut oil, olive oil, corn oil, grape seed oil, hazelnut oil, a nut oil, hemp oil, linseed oil, rice oil, safflower oil, sesame oil, mustard oil, or flax oil.

13. The tire subtread of claim 12, comprising a total amount of about 2 to about 8 phr of the at least one plant oil.

14. The tire subtread of claim 11, wherein the plant oil comprises soybean oil.

15. The tire subtread of claim 11, wherein the plant oil comprises sunflower oil.

16. The tire subtread of claim 11, wherein the at least 50 phr of natural rubber or polyisoprene comprises at least 50 phr of guayule natural rubber.

17. The tire subtread of claim 11, wherein the carbon black other than the recycled carbon black is present in an amount of no more than 10 phr.

18. The tire subtread of claim 11, having an overall ratio of carbon black to silica of 2/1 to 1/2.

19. The tire subtread of claim 11, wherein the rubber elastomer includes up to 50 phr of styrene-butadiene.

20. A tire subtread comprising a rubber composition comprising
  a rubber elastomer comprising 25 to 90 phr of guayule natural rubber and 75 to 10 phr of polybutadiene or styrene-butadiene,
  a recycled particulate rubber in an amount of about 1 phr to about 45 phr,
  about 1 to about 40 phr of a plant oil selected from soybean oil, sunflower oil, or a mixture thereof, and
  reinforcing filler including about 1 to about 45 phr of a recycled carbon black, about 10 to about 30 phr of a carbon black other than the recycled carbon black, and about 10 to about 30 phr of silica,
wherein the composition contains no more than 10 phr of any oil other than the plant oil, and
wherein the reinforcing filler has an overall ratio of carbon black to silica of 2/1 to 1/2.

* * * * *